(Model.)

G. G. FRELINGHUYSEN.
Twisting Attachment for Mowing Machines.

No. 231,788. Patented Aug. 31, 1880.

WITNESSES:
Joseph J. Sullivan,
Arthur W. Dunkle

INVENTOR:
G. G. Frelinghuysen (Model.)
G. G. FRELINGHUYSEN.
Twisting Attachment for Mowing Machines.
No. 231,788. Patented Aug. 31, 1880.
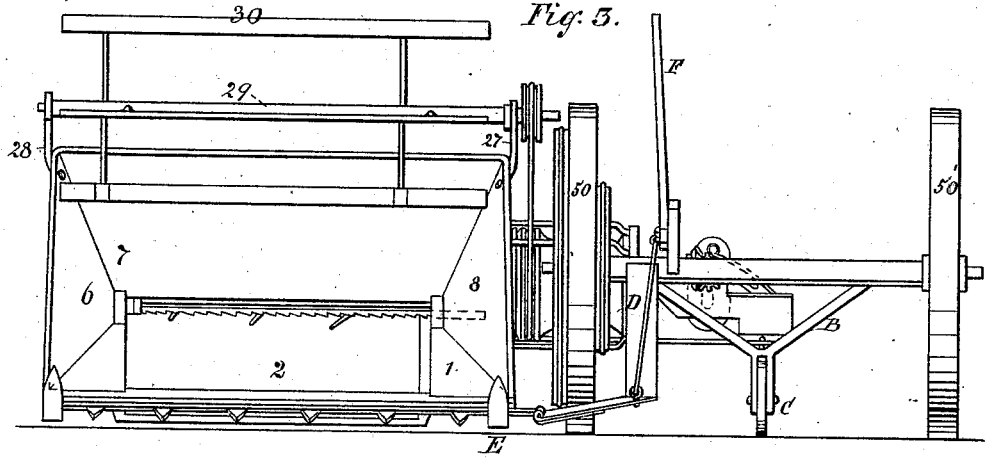
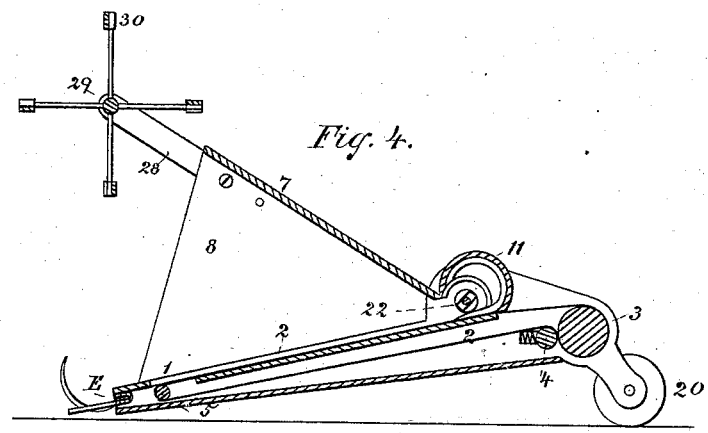
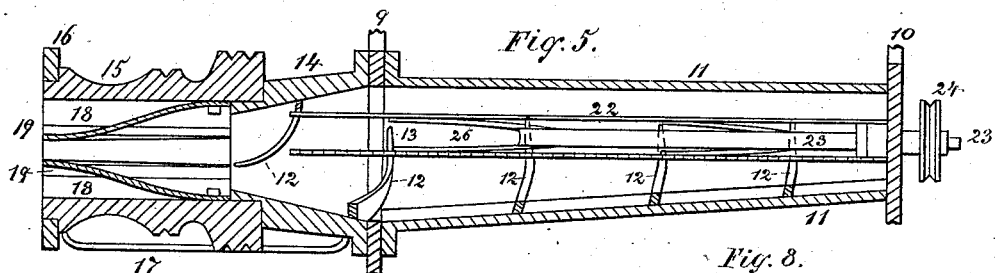
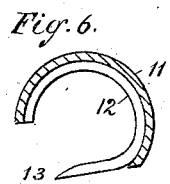 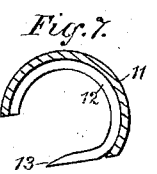 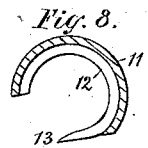
WITNESSES:
Joseph J. Sullivan
Arthur W. Dunkel
INVENTOR:
G. G. Frelinghuysen (Model.)   3 Sheets—Sheet 3.
G. G. FRELINGHUYSEN.
Twisting Attachment for Mowing Machines.
No. 231,788. Patented Aug. 31, 1880.
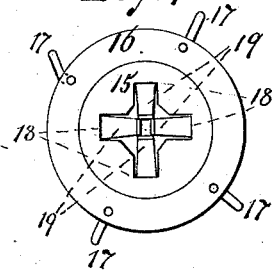
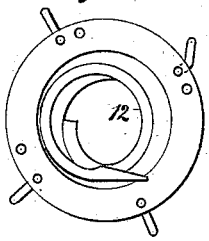
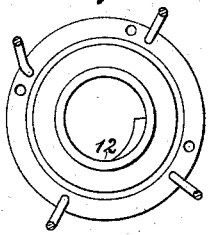
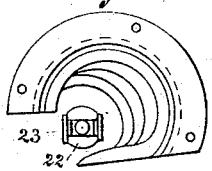
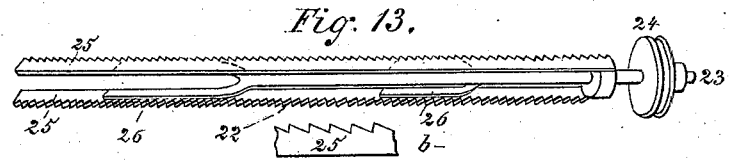
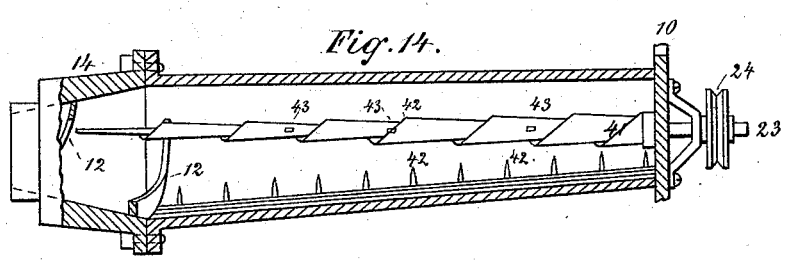
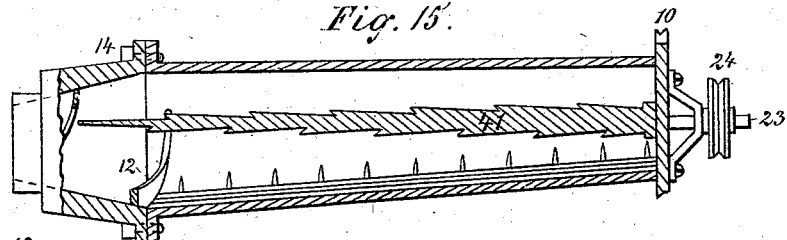
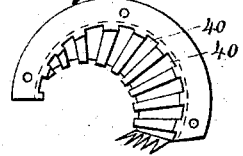
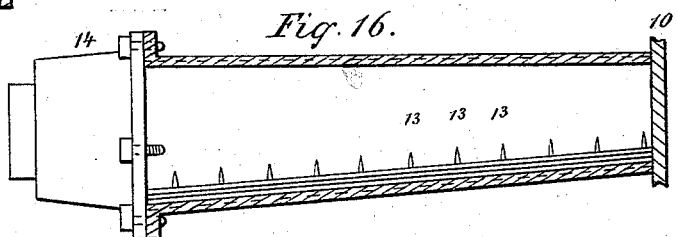
WITNESSES:
Joseph J. Sullivan,
Arthur W. Dunkill
INVENTOR:
G. G. Frelinghuysen

UNITED STATES PATENT OFFICE.

GEORGE G. FRELINGHUYSEN, OF NEWARK, NEW JERSEY.

TWISTING ATTACHMENT FOR MOWING-MACHINES.

SPECIFICATION forming part of Letters Patent No. 231,788, dated August 31, 1880.

Application filed June 18, 1880. (Model.)

*To all whom it may concern:*

Be it known that I, GEORGE G. FRELINGHUYSEN, of the city of Newark, in the county of Essex and State of New Jersey, have invented a new and useful Improvement in Twisting Attachments for Mowing-Machines, (Case C,) of which the following is such full, clear, and exact description as will enable others skilled in the art to which my invention appertains to make and use the same, when taken in connection with the accompanying drawings, in which—

Figure 1:
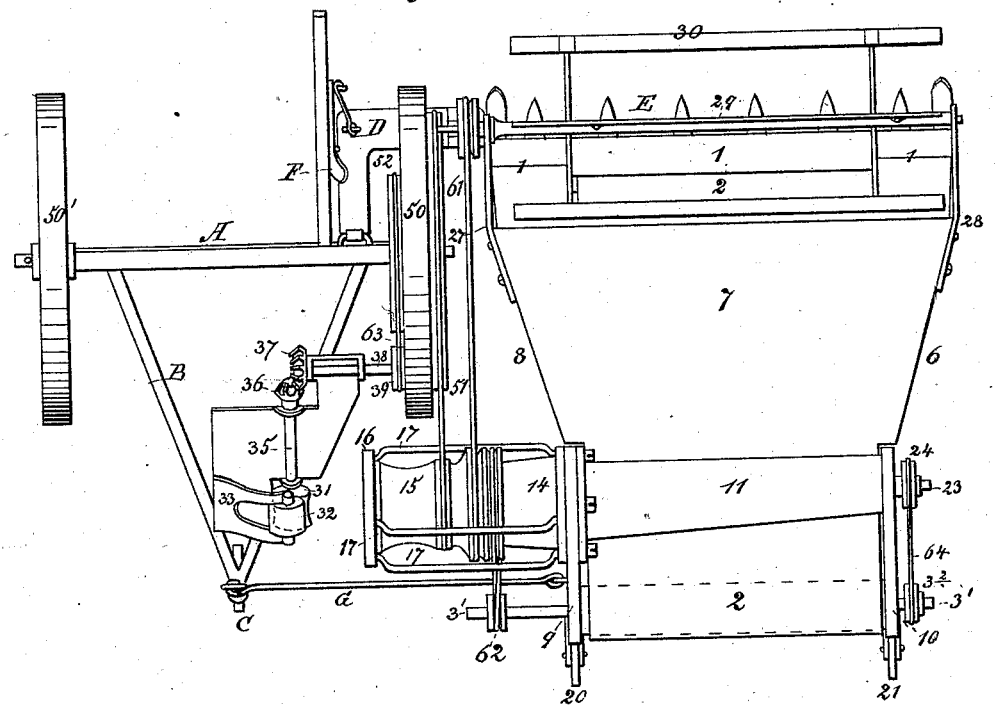
Figure 2:
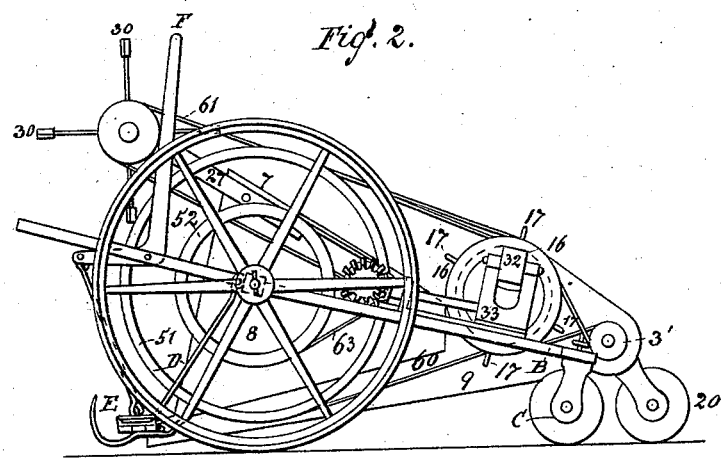

Figure 1 is a top view of a mower having the twisting attachment. Fig. 2 is a side view of the same from the left-hand side. Fig. 3 is a front view of the same. Fig. 4 is a section, through the cutter-bar, of the mower and the twisting attachment. Fig. 5 is an enlarged horizontal section through the cylinder-reducer and revolving sleeve, showing the twister in perspective. Fig. 6 is a cross-section of the cylinder, showing an internal flange and tooth near the larger end of the cylinder. Fig. 7 is a similar view near the center. Fig. 8 is a similar view near the smaller end. Fig. 9 is an end view of the revolving sleeve and holding-ring. Fig. 10 is an end view of the reducer as viewed from the larger end. Fig. 11 is an end view of the same as viewed from the smaller end. Fig. 12 is an end view of the conical tube, the reducer and revolving sleeve being removed. Fig. 13 is an enlarged perspective view of the twister *b*, showing the form of teeth thereon. Fig. 14 is a view of a modification, the conical tube being in section and the twister in perspective. Fig. 15 is a view of the same, showing a section of the twister. Fig. 16 is a section of the conical tube, showing the teeth on the edge and grooves on interior. Fig. 17 is an end view of the conical tube, showing the teeth and longitudinal grooves as used in the modification.

The nature of my invention consists in an attachment for mowing-machines by which the hay or grass, as it is cut by the mowing-machine, is twisted into a rope-like form by the attachment, and in the combination of the mowing-machine and twisting attachment, and in the various combinations and parts hereinafter set forth and claimed.

A mowing-machine having an axle, A, to which the driving-wheels 50 50' are attached and by which the operating mechanism of the cutter-knife is driven, having the frame B, trailing wheel *c*, and cutter-bar E, yoke D, and adjusting-lever F, as ordinarily constructed, is preferably used with my attachment.

The gathering attachment is fastened to any suitable machine by fastening the front edge of the platform to the cutter-bar and connecting the rear part of the frame of the attachment to the frame near the trailing wheel of the mowing-machine by the rod G.

The twisting attachment is made as follows: The platform 1 is fastened to the side frames, 9 and 10, in which the rollers 3, 4, and 5 are journaled. The endless apron 2 passes around the platform and the rollers 3 and 5, being pressed against the roller 3 by the roller 4, which is held in spring journal-boxes.

The side frames, 9 and 10, are supported at their rear by the trailing rollers 20 21.

At or near the rear or back of the platform 1 is the conical tube 11, (shown at Figs. 5, 6, 7, and 8,) a segment of which, about one-third its circumference through its entire length, is cut away. This conical tube is attached at one end to the side frame, 10, and at the other end to the side frame, 9, which is cut away to correspond with the interior of the end of the conical tube, which is fastened to it. One edge of this conical tube, from which the segment is cut, has on it projections, and lies near the back end of the platform. Between this edge of the tube and the platform the apron 2 passes. To the other edge of the conical tube is fastened a hood, 7, extending over the platform, and has the sides 6 and 8, connecting it with the platform 1. This hood is high enough from the platform at the front end to allow the hay or grain as it is cut to fall on the platform, and slopes gradually back to the conical tube, with which it joins.

The apron may be made the full width of the platform, when the hood will be made of equal width, and the conical tube of the same length as the width of the platform.

To the interior of the conical tube are fastened spiral flanges 12, which may, if desired, be made continuous with the teeth 13 on the edge of the conical tube. These flanges have the pitch of a screw-thread running from the edge of the tube near the apron up and toward the large end of the conical tube.

A reducer, 14, consisting of a short conical tube having on its interior surface a continuation of the screw-flange 12 of the conical tube 11, is fastened by its larger end to the frame 9, so as to match on and form a continuation of the conical tube 11.

On the outer or smaller end of the reducer 14, fitted over and encircling it, is the revolving sleeve 15, which at its other end fits in the ring 16, held by proper braces 17 to the frame 9. The sleeve 15 is so held on this reducer and ring that it is free to revolve about its axis.

This revolving sleeve is made as follows: On the interior surface of the sleeve are cut longitudinal grooves, extending entirely through the length of the sleeve. In each groove, and attached to the revolving sleeve at or near the end nearer the reducer, is a spring, 19 19, of such a form that they each converge toward the center of the revolving sleeve near the end farther from the reducer, so arranged that the springs may be pressed down into the grooves of the revolving sleeve, and will, by their spring action, press toward the center of the revolving sleeve.

The number and size of the grooves and springs may be varied to suit circumstances.

The twister 22, consisting of the shaft 23, having two spring-bars, 25 25, thereto attached, is fastened to the shaft 23, near the journal of the shaft, rigidly and by connecting-springs 26 26, one end of each of which is fastened to the shaft, and the other end to one of the spring-bars, so that the spring-bars are attached to the shaft 23 and are compressible toward it. The edge of the spring-bar 25 is serrated or toothed, as shown in Fig. 13, at b, the points of the teeth leaning toward the reducer as the machine is made.

The shaft 23, having the twister or spring-bars attached, as above described, is journaled in the side frame, 10, at the center of the smaller end of the conical tube, so that the shaft and spring-bars extend along the axis, or near the axis, of the conical tube, being journaled in a long or double journal-box, as it has no other bearing.

To the sides of the hood 6 and 8, near the forward part, are attached two arms, 27 and 28, so as to be adjusted. These arms 27 and 28 have in them, near their upper ends, journal-boxes, in which the shaft of the reel 30 is held and turns. The reel is made as they ordinarily are, and needs no description further than the drawings.

A pair of feeding-rollers—one concave in the profile of its axial section, if preferred, and the other straight—are arranged, one being held in fixed bearings on the shaft 35, and the other is pressed against it by the spring 33, to which the journal-boxes of the roll are fastened. The roller 31, on the shaft 35, has motion given it by the bevel-gearing 36 and 37 on the shaft 38, also having on it the pulley 39, which is driven by the belt 63, which also encircles the pulley 52 on the side of the main wheel 50. These rollers feed or draw forward the twisted hay or grass from the twisting attachment, and may be placed on the mowing-machine, as here shown, or on the ring 16, which encircles the end of the revolving sleeve.

On the driving-wheel 50 of the mowing-machine, with which my gathering attachment is combined, are fastened the rings or pulleys 51 and 52 on the out and inside, respectively. On the revolving sleeve 15, or cut in its surface, are three pulleys or grooves, in which the bands 60, 61, and 62 run to give motion to the revolving sleeve by the band 60, passing around the pulley 51 on the main wheel 50, band 61, passing around the revolving sleeve and the pulley on shaft 29 of reel 30, band 62, passing around the revolving sleeve and the pulley on the shaft 3' of roller 3, the band being crossed to give motion to the endless apron 2 in the right direction. On the other end of the shaft 3' is the pulley $3^2$, about which the band 64 passes, as it also does about a pulley, 24, on the shaft 23 of the twister, and gives motion to the twister within the conical tube 11. The band 64 is crossed, so as to give motion to the twister in the proper direction.

The pulleys should each be made to receive chain-belts, and chain-belts should be used in conveying motion to the several parts; or they may be geared together in any appropriate manner.

The movement of the different parts should be so timed that the roll 31 and the apron 2 shall each have a surface speed about equal to or a little greater than the speed of the periphery of the wheel 50.

The outside of the twister 22 should move faster, and may be made sometimes to move very much faster, than the speed of the apron, and the revolving sleeve should make one revolution while the machine is making an advance of from one to five feet, while the bars of the reel should move about twice as fast as the machine advances.

The mode of operation is as follows: The mower, with the twisting attachment, is drawn in the manner usual with mowers. The grass or grain is beaten down on the platform by the reel as it is cut by the cutters, and is carried by the apron up the platform and under the conical tube, caught by the teeth on the edge of the conical tube, raised from the apron, and pressed against the rear side of the conical tube, while the apron passes under the teeth, bringing more grass or grain, and pressing it into the conical tube, pressing forward that already in the tube, and as it follows around in the tube it takes in the screw-flanges, and is carried by them toward the end of the tube and reducer, being aided in its course in the tube by the twister 22 turning in the tube and the revolving sleeve at the end of the reducer, into which the twisted hay or grain passes from the revolving sleeve, which is so made that it accommodates itself to the size of the roll passing through. The roll is passed between the rollers 31 and 32, by which it is fed or drawn forward through the revolving sleeve and conical tube.

I will now describe some modifications which may be made in the twisting attachment.

Instead of the twister and internal screw-flange on the interior of the conical tube the conical tube may be made as shown in Figs. 14, 15, 16, and 17, the edge of the tube near which the apron passes having upon it teeth or projections 13, which project over and near the apron, the interior of the conical tube being provided with longitudinal grooves 40 40, Fig. 17. On the shaft 23 is attached a cone, 41, having about it a spiral flange or step, 42, so made that the revolution of the cone within an encircling mass of hay or grain will push it toward the reducer and revolving sleeve. On the cone are teeth or projections 43, to catch in and carry with the cone the hay or grain. These have a slight slant, so that their outer points are inclined toward the point or apex of the cone and about the cone, as set out in my application for hay-gatherers, (marked B,) made about this time.

The longitudinal grooves within the conical tubes may extend through the tube or reducer 14, making continuous longitudinal grooves from the small end of the conical tube to the small end of the reducer; or the reducer may have the screw-flange 12, as shown in Figs. 14 and 15.

The revolving sleeve 15 may be omitted from either form, the remaining parts being properly geared to give motion to the twister-apron and other working parts.

The twister 22 may be omitted from the first form described. The apron and revolving sleeve will give the grass or grain the necessary twist. The reel and hood are not at all times necessary, though they are of great advantage to the operation of the machine in some conditions of the grass and wind.

The attachment may be made with a driving-wheel for its several parts, as is shown in applications A and B, made by me about this time, instead of deriving motion from the mowing-machine, to which it is attached.

The attachment herein described should be so fastened to the cutter-bar of the mowing-machine with which it is to be used that the upper side of the platform 1 will be about even with the upper side of the cutter-bar, the cutter-bar being fastened to the front side of the platform.

The rake shown and described in application A may be attached to the cutter-bar, so that the teeth of the rake abut against the cutter-bar and receive any grass or grain that may be cut by the mowing-machine.

The hay-gatherer shown and described in application B may be attached to a mowing-machine, so that the upper side of the lower apron is even with the cutter-bar and runs near it as the apron on platform 1 herein.

I do not claim herein the combination of a cylinder having a portion thereof cut away, an apron moving under and in combination with the same and operating mechanism; nor the cylinder partially cut away through its whole length, having projections on one edge and longitudinal strips on the inner surface, as they are claimed in an application for patent for improvement in hay-gatherers made by me about this time.

What I claim as new, and desire to secure by Letters Patent of the United States, is—

1. The combination of the platform, apron, apron-operating mechanism, and conical tube, a segment of which is cut away, having on one edge teeth projecting over and close to the apron, as specified and set forth.

2. The combination of the platform, apron, apron-operating mechanism, and conical tube, a segment of which is cut away, and having an internal spiral flange, as specified.

3. The combination of the platform, apron, apron-operating mechanism, and conical tube, a segment of which is cut away, having on one edge teeth projecting over and close to the apron, and having an internal spiral flange, as specified.

4. The combination, with the cutter-bar of a mowing-machine, of a platform, apron and operating mechanism, and conical tube, from which a segment has been cut, so arranged that the top of the apron moves directly back from the cutter-bar and passes under and close to the edge of the conical tube, as specified and set forth.

5. The revolving sleeve herein described, having longitudinal internal grooves and springs, as specified and set forth.

6. The combination of a conical tube having internal spiral flanges, and a twister and operating mechanism, as specified and set forth.

7. The combination of a platform, apron, conical tube, twister, and operating mechanism, as specified.

8. The combination of a platform, apron, conical tube, twister, revolving sleeve, and operating mechanism, as specified and set forth.

9. The twister herein described, consisting of a shaft having attached by springs spring-bars, as specified and as set forth.

10. The twister, revolving sleeve, and feed-rollers, combined with operating mechanism, as specified and set forth.

11. The platform, apron, conical tube, twister, revolving sleeve, and feed-rollers, combined with operating mechanism, as specified.

12. The platform, apron, conical tube, reducer, twister, and feed-rollers, combined with operating mechanism, as specified and set forth.

13. The platform, apron, conical tube, twister, and feed-rollers, combined with operating mechanism, as specified and set forth.

G. G. FRELINGHUYSEN.

Witnesses:
PERRY BELMONT,
ARTHUR DUDLEY VINTON.